Figure 1:
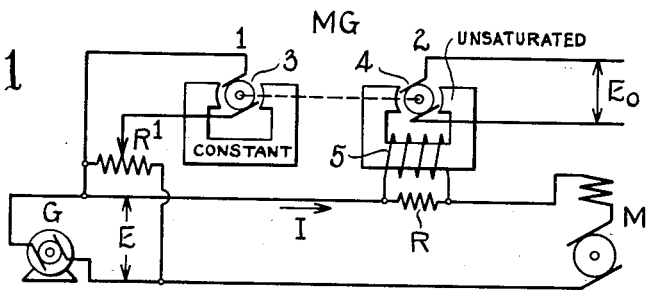

Jan. 8, 1952          E. BENNETT          2,581,831
MEANS FOR MEASURING AND REPORTING VARIABLES OF
ELECTRIC AND ELECTROMECHANICAL SYSTEMS
Filed July 11, 1947

Inventor
Edward Bennett
By Frank W. Hubbard
Attorney

Patented Jan. 8, 1952

2,581,831

UNITED STATES PATENT OFFICE 2,581,831

MEANS FOR MEASURING AND REPORTING VARIABLES OF ELECTRIC AND ELECTROMECHANICAL SYSTEMS

Edward Bennett, Madison, Wis., assignor to Cutler-Hammer, Inc., Milwaukee, Wis., a corporation of Delaware Application July 11, 1947, Serial No. 760,327

1 Claim. (Cl. 322—25)

This invention relates to improvements in means for measuring and reporting variables of electric and electromechanical systems, and more particularly to means reporting in generated E. M. F. or current.

An object of the invention is to provide measuring and reporting means of simplified form which will measure variables and report in generated E. M. F. or current of values proportional to the product or to the quotient of measured quantities or proportional to the reciprocal or to the square, or to the square root of a measured quantity, as may be desired.

Another object is to accomplish such measuring and reporting through the medium of a simple and inexpensive direct current motor-generator set.

Various other objects and advantages of the invention will hereinafter appear.

Certain embodiments of the invention are illustrated diagrammatically in the accompanying drawing and the same will now be described, it being understood that the embodiments illustrated are susceptible of various modifications without departing from the scope of the appended claim.

Figure 2:
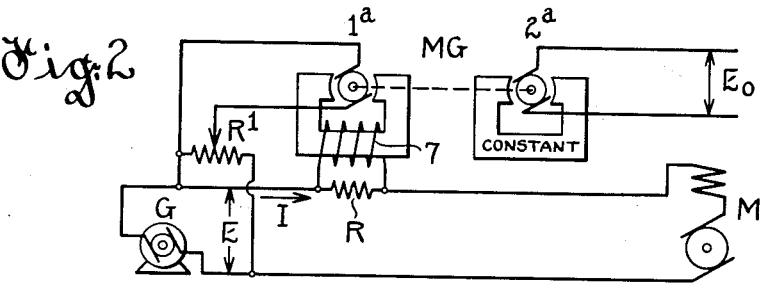
Figure 3:
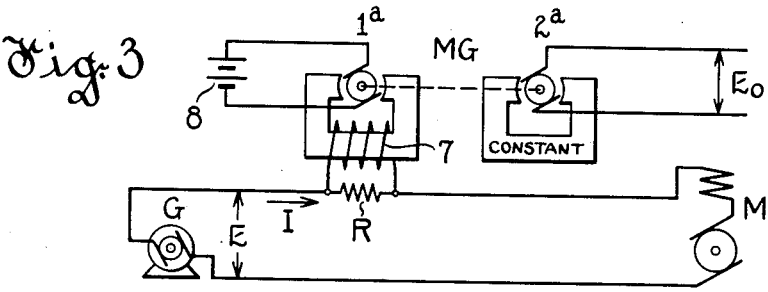
Figure 4:
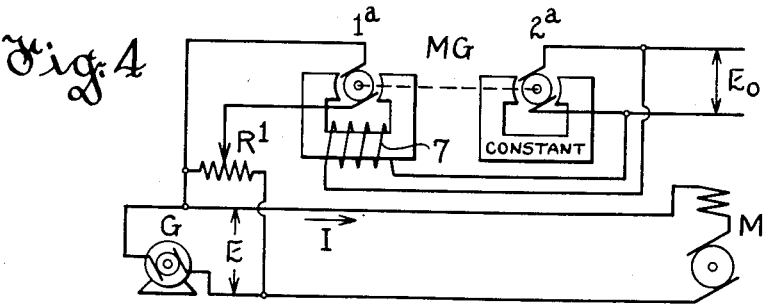

In the drawing,

Figure 1 shows a system wherein a motor-generator set is employed to report in E. M. F. proportionally to the product of voltage and current variables;

Fig. 2 shows a modification of the system shown in Fig. 1 to utilize the motor-generator set as a quotient reporter;

Fig. 3 shows a modification of the system of Fig. 2 to utilize the motor-generator set to report in E. M. F. proportionally to the reciprocal of a measured quantity, and Fig. 4 shows another modification of the system of Fig. 2 to utilize the motor generator set to report in E. M. F. proportionally to the square root of a measured E. M. F.

For exemplary purposes all figures of the drawing show the measuring and reporting means coordinated with a direct current generator G supplying a series wound motor M, and for simplicity of illustration the motor is shown as connected in a closed loop with the armature of the generator. As will be understood, the generator may be driven by any suitable means and the system may be controlled or regulated under the influence of the measuring and reporting means by any of the well-known appropriate means. No regulating means have been shown as this application is directed particularly to the measuring and reporting means.

Referring particularly to Fig. 1, it shows a resistor R in series with motor M and a potentiometer resistor $R^1$ connected across the generator terminals. It shows the measuring and reporting means as comprising a relatively small direct current motor-generator set MG consisting of a driving motor I and a generator 2 having coupled together, as indicated by a broken line, their armatures 3 and 4 respectively. In this instance the motor I is designed for constant field strength and for indication of this characteristic the field magnet thereof is so labeled, said magnet being either of the permanent type or of the coil type supplied from a constant potential source. The armature 3 of motor I is connected across a selected portion of the potentiometer resistor $R^1$ and hence is subjected to an E. M. F. proportional to the E. M. F. of generator G. The generator 2 of the MG set has an unsaturated field magnetized by a coil 5 connected across resistor R in series with motor M and hence the field of generator 2 is magnetized by a current proportional to current delivered to motor M.

Thus neglecting resistance loss of voltage in the armature of motor I and neglecting saturation effects in the field of generator 2, the output E. M. F. of generator 2 is proportional to the product of voltage and current of the generator G and motor M, or in other words, proportional to the wattage input to motor M. As first approximations the relations are, Speed of motor I
$n$ (R. P. M.) is proportional to E
$E_0$ (volt) is proportional to $nI$
$E_0$ (volt) is proportional to EI Assuming change of the system of Fig. 1 to disconnect the field coil of generator 2 from the resistor R and to connect said field coil across a portion of potentiometer resistor $R^1$ the reported E. M. F. would be directly proportional to the square of the E. M. F. of generator G.

Referring to Fig. 2, the system differs from that shown in Fig. 1 in that motor $I^a$ has an unsaturated field to be magnetized by a coil 7 connected across resistor R, while the generator $2^a$ has a constant field. As in Fig. 1, the armature of motor $I^a$ is connected across a portion of the potentiometer resistor $R^1$. Neglecting the resistance loss of voltage in the armature of motor $I^a$ and saturation effects in the field of said motor, the relations are, Speed of motor $I^a$
$n$ (R. P. M.) is proportional to $E/I$
$E_0$ (volt) is proportional to $n$
$E_0$ (volt) is proportional to $E/I$ Thus if E represents the E. M. F. applied to the armature brushes of a series motor and I represents the current in the series field of that motor the reported E. M. F. is proportional to the speed of the series motor (over the unsaturated region of the motor field). If, on the other hand, E represents the E. M. F. across the terminals of a resistor and I the current through the resistor the reported E. M. F. is proportional to the resistance of the resistor.

Referring to Fig. 3, the showing is the same as that of Fig. 2 except that the potentiometer resistor $R^1$ is omitted, while the armature of motor $1^a$ is connected across a battery 8 representing a source of constant E. M. F. In this system the generator $2^a$ reports the E. M. F. whose value is proportional to the reciprocal of the quantity measured, namely the current I. This will be apparent from the analysis of the Fig. 2 showing.

As will be understood, the aforediscussed proportionalities hold as first approximations and only within limits. For example, in the systems of Figs. 2 and 3 if the current I approaches zero the speed of motor $1^a$ and the current taken by its armature become unpermissibly great.

Referring to Fig. 4, the showing thereof is substantially like that of Fig. 2 except for omission of the resistor R and change of connection of the field coil 7 of motor $1^a$ to connection across the terminals of the armature of generator $2^a$. With these connections the following relations apply to a first approximation and over a limited range in the value of the E. M. F. of generator G, The speed of motor $1^a$
$$n = K_1 E / E_0$$
The reported E. M. F.
$$E_0 = K_2 n = K_1 K_2 E / E_0$$
Whence
$$E_0 = \sqrt{K_1 K_2} \sqrt{E} = K \sqrt{E}$$

Thus the E. M. F. developed by generator $2^a$, or in other words, the reported E. M. F. is proportional to the square root of the measured E. M. F., namely that developed by generator G.

It is to be understood that while the MG set is shown as comprising separate armatures and separate field frames, it might assume other known forms capable of performing the functions herein set forth. It is also to be understood that while no means have been shown for compensating for RI drop and saturation effects tending to cause departure from straight line relations any of the well known expedients for this purpose, as for example compound windings, may be employed.

What I claim as new and desire to secure by Letters Patent is:

The combination with a direct current motor-generator set having the field of its motor of substantially constant strength and having the field core of its generator unsaturated and provided with a magnetizing coil, of means subjecting the armature of said motor to a variable impressed E. M. F. and subjecting the field coil of said generator to variable magnetizing current for an output of said generator proportional to the product of such variables.

EDWARD BENNETT.

REFERENCES CITED

The following references are of record in the file of this patent:

UNITED STATES PATENTS

| Number | Name | Date |
|---|---|---|
| 591,343 | Dunn | Oct. 5, 1897 |
| 684,084 | Moskowitz | Oct. 8, 1901 |
| 1,231,604 | Hellmund | July 3, 1917 |
| 1,699,775 | Binney | Jan. 22, 1929 |
| 2,347,037 | Edwards et al. | Apr. 18, 1944 |
| 2,427,587 | Bloodworth | Sept. 16, 1947 |